United States Patent Office 3,362,598
Patented Jan. 9, 1968

3,362,598
HANDLE FOR SHOPPING BAGS AND THE LIKE
Kurt Rieger, Ottweiler Strasse 38, Dusseldorf, Germany
Filed June 8, 1966, Ser. No. 556,181
Claims priority, application Germany, June 12, 1965,
R 30,786
5 Claims. (Cl. 224—45)

ABSTRACT OF THE DISCLOSURE

The present invention relates to a handle for insertion into the upper portion of a shopping bag which is provided with a longitudinal cutout at oppositely located upper shopping bag areas. The invention is characterized primarily in that said handle comprises a central handle section adapted to be grasped by hand and two leg sections respectively connected to opposite end portions of said handle section while closure strip means extending at least approximately parallelly to the common plane through both of said leg sections are connected to said leg sections through spacer means at least equalling the total thickness of two oppositely located shopping bag upper portions for which the handle is intended, the configurations of said closure strip means defining an area in excess of the cutout in the shopping bag for which said handle is intended, said closure strip means and said handle section as well as said leg sections and said spacer means forming with each other a single integral unitary piece. The configuration and size of said central handle section and said leg sections is such as to permit passage thereof through the longitudinal cutouts in the upper shopping bag areas.

---

The present invention relates to shopping bags, and, more particularly concerns a handle of synthetic material or the like, which can be inserted into a stamped out opening of a finished shopping bag. The handle itself may consist of synthetic material or the like.

Heretofore, handles of synthetic material for shopping bags have become known according to which the loop shaped handle portion has its ends provided with hook-shaped extensions which are respectively passed through stamped out holes in the shopping bag and due to said hook formations connect the handle with the shopping bag while preventing an opening of the bag.

It is also known in connection with handles, to move the two ends of a handle together and to arrange said ends on a closure plate, which, when the shopping bag is in condition for use is located on that side of the upper closure parts which is located opposite the handle. With these known handles for shopping bags it has been found difficult to insert these handles into the stamped out openings of the shopping bag and to establish a satisfactory connection between the handle and the shopping bag.

It is an object of this invention to provide a handle, especially of synthetic material, for a shopping bag, which can easily be inserted into a filled shopping bag.

It is another object of this invention to provide a handle for shopping bags, which will have a satisfactory connecting surface between the handle and the shopping bag.

It is still another object of this invention to provide a handle as set forth above, which will yield a proper closing of the shopping bag and afford an easy carrying of the shopping bag.

These and other objects and advantages of the invention will appear more clearly from the following specification in connection with the accompanying drawing, in which.

The handle according to the present invention is characterized primarily in that it comprises a band shaped handle portion the ends of which merge with leg portions which in their turn have connected thereto an approximately rectangular closure plate, said handle portion and said leg portions as well as said closure plate forming a single continuous integral piece while the sections respectively connecting said closure plate with the respective adjacent leg sections are formed by webs. The leg portions preferably have a circular cross section.

The provision of the lateral webs arranged on said closure plate permits a good location of the shopping bag at its reinforced cutout on the handle so that also heavy shopping bags can be safely carried. Furthermore, the approximately rectangular design of the closure plate furnishes a good closure for the cutouts of the shopping bag.

The handle may be so designed that a closure strip connected to the handle portion is provided with extensions extending parallel to the handle strip. This design assures a good location and holding of the handle passed through the stamped out or cutout portion of the shopping bag while at the same time material is saved with regard to the above outlined embodiment having a closure plate. In order to prevent the handle from sliding out of the cutout in the shopping bag when the latter is resting on a support, the leg portions of the handle may be provided with noses.

Figure 1:
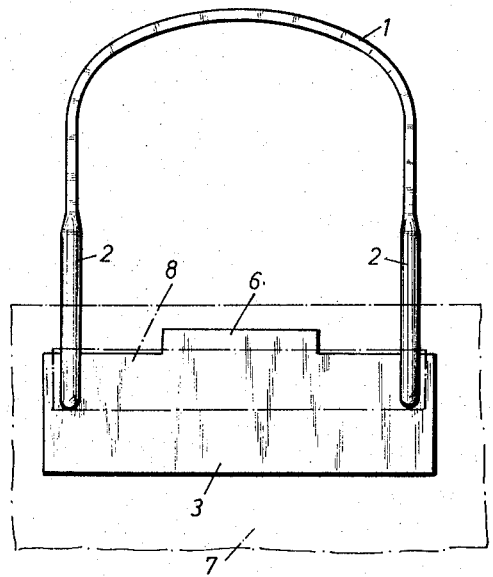
FIGURE 1 is a side view of the handle according to the present invention.
Figure 2:
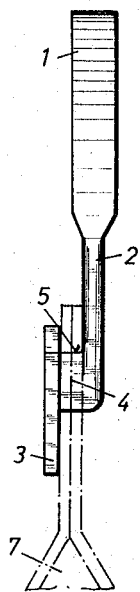
FIGURE 2 is an end view of the handle of FIG. 1.

Referring now to the drawing in detail and FIG. 1 thereof in particular, the handle shown therein and intended for a shopping bag of paper, synthetic material or the like is preferably made of synthetic material and comprises a band-shaped handle portion 1. The handle portion 1 merges with the leg portions 2 which are preferably of circular cross section. Connected to said leg portions 2 is a substantially rectangular closure plate 3. The parts 1, 2, and 3 are formed as a single integral unitary piece. As will be seen from the drawing, the leg portions 2 are connected to lateral portions of the closure plate 3 by web portions 4. These web portions 4 furnish supporting surfaces 5 for engagement with the upper edge of the stamped out window 8 in the shopping bag.

In order to prevent the closure plate 3 from laterally sliding in the window 8 and from accidentally leaving said window, the upper edge of closure plate 3 is provided with an extension or tongue 6 forming a lateral surface of engagement with the shopping bag 7. This tongue or extension 6 may, as shown in FIG. 1, extend only over the central portion of closure plate 3, however, if desired it may also extend over the entire length of plate 3.

Figure 3:
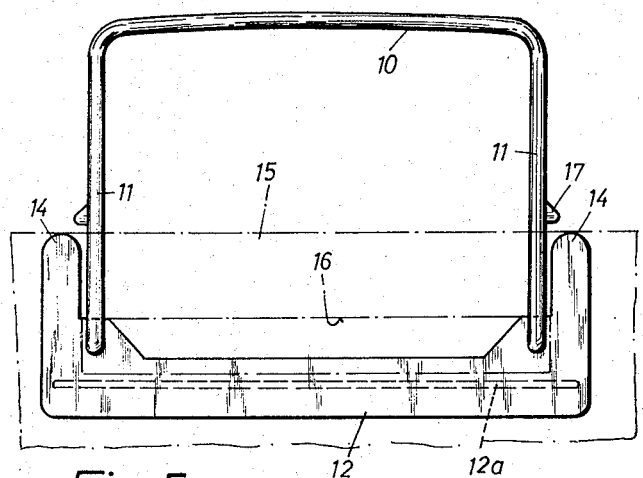
FIGURE 3 is a side view of a modified handle according to the invention.
Figure 4:
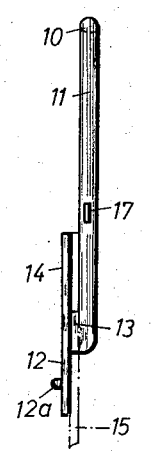
FIGURE 4 is an end view of the handle of FIG. 3.
Figure 5:
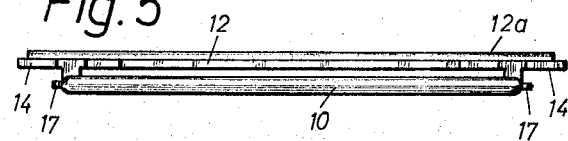
FIGURE 5 is a top view of FIG. 3.

Referring now to the embodiment illustrated in FIGS. 3 and 4, the handle shown therein is likewise made of synthetic material as a single unitary piece. More specifically, the handle of FIG. 3 comprises a handle portion 10 having lateral legs 11 connected to a closure strip 12. The legs 11 are connected to said closure strip 12 by means of web portions 13. At the ends of the closure strip 12 there are provided extension means 14 which extend upwardly and parallel to the leg portions 11. The shopping bag 15 is in a manner known per se provided with a substantially rectangular cutout or stamped out portion 16. In order to connect the handle to the shopping bag 15, the handle portion 10 is first passed through the cutout 16; that portion of the shopping bag which is above the cutout 16 will then rest upon the webs 13 and will be held toward one side by the legs 11 and on the other side by the extension means 14 (FIG. 4).

If desired, the leg portions 11 may additionally be provided with noses 17 which prevent the handle from slipping out of the window or cutout 16. Finally, the closure strip 12 may be provided with a bead portion 12a for reinforcing said strip 12.

It is, of course, to be understood that the present invention is, by no means, limited to the particular arrangements shown in the drawings, but also comprises any modifications within the scope of the appended claims.

It may also be mentioned that while any suitable synthetic material may be used for making the handle according to the invention, material such as polyethylene has proved particularly successful in this connection.

What I claim is:

1. An insertable handle for insertion into a shopping bag provided with a longitudinal cutout at oppositely located upper shopping bag areas, which comprises: a handle section adapted to be grasped by a hand, two leg sections respectively connected to opposite end portions of said handle section and forming a substantially U-shaped contour with said handle section, the size and contour of said handle section and said leg sections being such as to permit passage thereof with said handle sections first through the longitudinal cutouts in the upper areas of a shopping bag for which the handle is intended, closure strip means extending at least approximately parallely to the common plane of and interconnecting said two leg sections while being laterally spaced from said leg sections by a distance at least equalling the total thickness of two oppositely located shopping bag upper portions for which said handle is intended, the configurations of said closure strip means defining an area in excess of the cutout in the shopping bag for which said handle is intended, and spacer means interposed between each of said leg sections and the respective adjacent lateral surface area of said closure strip means to effect the desired spacing therebetween, said handle section and said two leg sections as well as said closure strip means and said spacer means consisting of one and the same material and forming with each other a single integral unitary piece.

2. A handle according to claim 1, which consists in its entirety of synthetic material.

3. A handle according to claim, in which the leg portions are of a substantially circular section while said handle section is band-shaped.

4. A handle according to claim 1, in which said closure strip means is provided with extension means extending substantially parallel to said handle section.

5. A handle according to claim 4, in which said leg portions are provided with abutment means near that edge of said extension means which faces toward said handle section.

References Cited
UNITED STATES PATENTS

| | | | |
|---|---|---|---|
| 1,675,439 | 7/1928 | Wolf | 229—54 |
| 1,985,571 | 12/1934 | Hetzel | 224—45 |

FOREIGN PATENTS

| | | |
|---|---|---|
| 1,320,574 | 1/1963 | France. |

HUGO O. SCHULZ, *Primary Examiner.*